United States Patent Office 3,269,938
Patented August 30, 1966

3,269,938
HYDROGENATION PROCESS AND CATALYST THEREFOR
Philip A. Lefrancois, Cranford, N.J., assignor to Pullman Incorporated, Chicago, Ill., a corporation of Delaware
No Drawing. Filed June 1, 1964, Ser. No. 371,760
11 Claims. (Cl. 208—142)

This application is a continuation-in-part of my prior and co-pending application Serial No. 837,573, filed September 2, 1959, now abandoned.

This invention relates to an improved hydrogenation process. In one aspect this invention relates to an improved catalyst comprising molybdenum, particularly useful for catalyzing hydrogenation reactions. In another aspect this invention relates to a particularly improved catalyst for the hydrogenation of low-quality kerosene.

The treatment of unsaturated hydrocarbons with hydrogen in the presence of a hydrogenation catalyst is well known in the art. With some exceptions the desirability of liquid fuels and lubricants is roughly proportional to the combined hydrogen that each contains. With the exception of cracked products, however, many petroleum fractions contain little or none of the easily hydrogenated olefinic groups so that deep-seated chemical changes are necessary to promote the entrance of hydrogen atoms into the molecules. High grade kerosenes are made up of saturated hydrocarbons, paraffins and naphthenes and are low in sulfur, nitrogen and oxygen compounds. However, kerosene distillates from most crudes usually possess few or none of these characteristics. By hydrogenation, aromatics of such kerosene distillates can be converted to naphthenes, any of the olefines present are saturated while sulfur, nitrogen and other extraneous elements are substantially removed as hydrogen sulfide, ammonia, etc. by the cracking and reduction of corresponding compounds.

The hydrogenation of aromatic hydrocarbons whether they are substantially the only components of the charge stock or are present as components of a hydrocarbon fraction is relatively difficult to effect. With the presently used catalysts a relatively severe combination of conditions must be applied even with catalysts of high activity. Under such severe conditions the selectivity of catalysts decreases due to concomitant reactions such as hydrocracking. This latter reaction is especially undesirable when it is desired to produce high yields of relatively pure petrochemicals since it leads to loss of yield of the desired product and makes the process more difficult to control to obtain the desired results.

It is an object of this invention to provide an improved hydrogenation process.

It is a further object of this invention to provide an improved process for the hydrogenation of aromatic hydrocarbons in good yield and selectivity.

It is a further object of this invention to provide a process of hydrogenating a hydrocarbon fraction containing unsaturated hydrocarbons by contacting said fraction with an improved catalyst comprising a compound of molybdenum.

It is a further object of this invention to provide a process for hydrogenating a hydrocarbon fraction boiling in the range of from about 325° F. to about 600° F. by contacting said fraction in the presence of hydrogen under hydrogenation conditions with an improved catalyst comprising molybdenum.

It is a further object to provide a new and improved hydrogenation catalyst and method for the manufacture thereof.

Various other objects and advantages of this invention will become apparent to those skilled in the art from the accompanying description and disclosure.

The above objects are accomplished by providing a particular catalyst composition comprising molybdenum and nickel on a particular carrier material composed of silica-magnesia. The catalytic agents may be in elemental form although it is preferred that the molybdenum and nickel be in combined form such as in the form of their oxides and/or sulfides. It has been found that the catalysts of this invention are particularly effective hydrogenation catalysts and are especially outstanding for their catalytic hydrogenative effect in improving the properties of low-quality kerosene fractions. In addition to their high hydrogenation activity, the catalysts of this invention also are outstanding for their ability to hydrogenate carbon-to-carbon double bonds in high selectivity, that is, without effecting concomitant reactions such as hydrocracking of the feed to lower boiling hydrocarbon fractions, gaseous hydrocarbons or coke.

The catalysts of this invention comprise an oxide and/or sulfide of molybdenum and nickel on a support composed of silica and magnesia, the magnesia content ranging between 10 and about 50 weight percent, based on the weight of the support, or between about 5 and about 47 weight percent, based on the total weight of the catalyst. The preferred content of magnesia ranges between about 20 and about 40 weight percent, based on the weight of the support, or between about 15 and about 37 weight percent, based on the total weight of the catalyst. The silica-magnesia support is prepared by methods well known to those skilled in the art. For example, one method comprises commingling an acid, such as hydrochloric acid or sulfuric acid, with commercial water glass under conditions to precipitate silica, washing with acidulated water or otherwise to remove sodium ions, commingling with a magnesium salt, such as magnesium chloride, magnesium sulfate or magnesium nitrate, and either adding a basic precipitant, such as ammonium hydroxide, to precipitate magnesia or forming the desired oxide by decomposition of the salt at an elevated temperature as the case permits. Another method for producing silica-magnesia composites is to add magnesia as a slurry in water to an acidic silica hydrosol, allow the resulting sol to set to a hydrogel, followed by drying and calcining of the hydrogel.

As indicated above, the catalytic agents which are carried on the silica-magnesia support are the oxides and/or sulfides of molybdenum and of nickel. The concentration of molybdenum compound, calculated as molybdenum trioxide, may vary over a relatively wide range, such as between 5 and about 30 weight percent, based on the total weight of the catalyst. The compound of nickel is used in an amount to provide an atomic ratio of molybdenum to nickel of between about 1 and 4.5. It has been found that the catalysts which exhibit optimum hydrogenation activity are those containing from about 6 to about 20 weight percent of the molybdenum compound calculated as molybdenum trioxide, based on the total weight of the catalyst, the nickel compound being present in an amount to provide a molybdenum to nickel ratio of between about 2 and about 3. To obtain an atomic ratio of between about 2 and about 3 within the aforesaid preferred concentration of molybdenum compound, the catalytic agent comprising nickel is present in an amount between about 1.0 and about 5.5 weight percent calculated as nickel oxide, and based on the total weight of the catalyst.

The catalysts of this invention may be prepared by a variety of methods without departing from the scope of this invention. Suitable precursor materials for the molybdenum compound are silicomolybdic acid, phosphomolybdic acid and ammonium molybdate. Typical examples of suitable precursors of the catalytic agent comprising nickel are nickel acetate, nickel chloride, nickel sulfate and nickel nitrate. Such molybdenum and nickel compounds may be incorporated into the catalyst at various stages of the catalyst preparation. The preferred method comprises impregnation or dry mixing of the silica-magnesia support with the precursor of the molybdenum catalytic agent prior to, or simultaneously with, impregnation or dry mixing of the support with the precursor of the nickel catalytic agent. Such catalysts generally lead to the production of catalysts of higher catalytic activity as compared with catalysts prepared by impregnation of the support with the nickel compound prior to impregnation with the molybdenum compound. When the co-impregnation technique is employed, a particularly active catalyst is produced by employing an aqueous solution of phosphomolybdic acid and nickel acetate. The catalysts also may be prepared by passing hydrogen sulfide into the silica-magnesia impregnated with the molybdenum and nickel precursor compounds.

After the impregnation of the support with each or both of the molybdenum and nickel compounds, the mixture may be dried if desired and/or calcined at an elevated temperature prior to the addition of the next ingredient. When employed, the drying step may be effected at a temperature of between about 100° F. and about 400° F. Calcination is effected at an elevated temperature such as between about 600° F. and about 1200° F. in the presence of air, hydrogen, oxygen or other inert gases. When the catalysts are prepared by dry mixing the silica-magnesia support with the precursors of the molybdenum or nickel catalytic agents, the mixture is calcined within the aforesaid temperature range.

Also included within the scope of the present invention is the incorporation of certain promoters during the catalyst preparation. These promoters include combined fluorine and boron oxide. When such promoters are included they are preferably incorporated into the catalyst prior to impregnation of the silica-magnesia support with the compounds of nickel and molybdenum. A typical method for incorporating the fluorine is to impregnate the silica-magnesia support with an aqueous solution of hydrofluoric acid in an amount sufficient to provide a finished catalyst containing between about 0.5 and about 5 weight percent fluorine, preferably between about 1 and about 3 weight percent fluorine, based on the total weight of the catalyst. Although the addition of fluorine as a promoter increases the hydrogenation activity of the catalysts of this invention, it has been found that the incorporation of boron oxide in a particular manner, leads to an extremely marked increase in the hydrogenation activity. In regard to boron oxide as a promoter it has been found that a catalyst prepared by addition of this promoter to the catalyst after the silica-magnesia support has been impregnated with the molybdenum and nickel compounds, decreases the activity of the catalyst. On the other hand, a similar catalyst prepared by impregnation of the support with the boron oxide precursor compound prior to impregnation with the molybdenum and nickel precursor compounds greatly enhances the hydrogenation activity of the catalyst. When boron oxide is used, it may be present in an amount between about 5 and about 20 weight percent, based on the total weight of the catalyst, the preferred content ranging from about 8 to about 15 weight percent.

In accordance with a preferred embodiment of the present invention, the calcined catalyst composite is preconditioned or activated with a gaseous stream comprising hydrogen sulfide, or the activation may take place in situ such as, for example, when the feed stock to be treated contains a high sulfur content. When the catalysts are preconditioned by contacting with hydrogen sulfide, hydrogen is preferably employed as the carrier gas although other carrier gases such as nitrogen and argon may be employed. The concentration of hydrogen sulfide in the carrier gas or of sulfur in the feed stock may vary between about 0.1 and about 5 mole percent, preferably between about 1 and about 3 mole percent. The preconditioning with hydrogen sulfide may be effected at a temperature between about 400 and about 1000° F. and at a pressure between about 50 and about 2000 pounds per square inch gage. Treatment is continued until sulfiding is completed and reaches a steady state which is conveniently determined by observing when the inlet and outlet gas compositions are identical. As a result of sulfiding, the oxide of molybdenum is converted to a sulfide such as $MoS_2$ or $MoS_3$, or mixtures thereof, and the oxide of nickel is converted to a sulfide such as $NiS$ or $Ni_2S_3$ or mixtures thereof.

The above-described catalysts find particular utility in the hydrogenation of unsaturated hydrocarbons including olefinically and aromatically unsaturated compounds. The feed stock may consist of a single unsaturated compound such as when a high purity product is desired or it may comprise a mixture of such hydrocarbons. Thus, for example, aromatically unsaturated compounds such as benzene, toluene, naphthalene, styrene, and derivatives thereof are suitable and typical reactants as well as the aliphatically unsaturated compounds including acyclic and alicyclic compounds such as, for example, cyclohexene, cyclohexadiene, cyclopentadiene, methylcyclopentene, butenes, pentenes, hexenes, heptenes, octenes, etc., acetylenes, etc., indenes, and derivatives thereof.

Also included within the scope of this invention is the hydrogenation of gasoline produced by a catalytic cracking process such gasoline usually being high in olefins particularly monoolefins. The catalysts of this invention also are advantageously employed for the selective hydrogenation of any diolefins present in catalytically cracked gasoline, to monoolefins in order to stabilize the gasoline against gum formation. Other feed stocks which may be hydrogenated by the catalysts of this invention are those in which the carbon to hydrogen ratio is high, as reduced crude oil and vacuum tower bottoms, i.e. hydrocarbon stock from which the lighter distillable fractions have been removed. Hydrogenation of such residual oils increases the gravity thereof and tends to prevent excessive coke lay down during subsequent treatment thereof such as during a subsequent hydrocracking process. In addition, the feed stock may be a hydrocarbon fraction boiling within the range of about 325° F. to about 600° F. such as in particular a kerosene fraction containing unsaturated components. By hydrogenation, the aromatics contained in the petroleum fraction are converted to naphthenes, any of the olefins which may be present are saturated to form a hydrogenated product substantially free of unsaturated components and of improved smoke point. At the same time, sulfur, nitrogen and other extraneous elements which are usually present in the kerosene fraction or vacuum bottoms feed stocks, for example, are substantially removed probably in the form of hydrogen sulfide, ammonia, etc.

In accordance with the process of this invention, a hydrocarbon or hydrocarbon fraction is contacted with the catalysts of this invention in the presence of added hydrogen under hydrogenation conditions with a net consumption of hydrogen to cause selective hydrogenation of the feed components with minimum hydrocracking, to produce product having a lower degree of unsaturation, which, in the case of a hydrocarbon fraction boiling within the kerosene range, is evidenced by improvement in smoke point. The process of this invention may be conducted over a wide range of temperatures without departing from the scope of this invention. The operating conditions include a temperature within the range of between about 200° F. and about 850° F., a pressure between about 0 pound per square inch gage (p.s.i.g.) and about 2000 p.s.i.g. and a space velocity (defined as pounds of feed per hour per pound of catalyst) between about 0.1 and about 15. Generally speaking, the conditions within which optimum results are achieved, i.e. high activity and good selectivity, include a temperature of between about 400° F. and about 800° F., a pressure between about 200 and about 1000 p.s.i.g. and a weight space velocity of between about 1 and about 10. It has been found that when the feed stock is a kerosene fraction boiling within the aforesaid range, the best combination of improvement in smoke point and selectivity of catalyst in producing a minimum of lower boiling hydrocarbon fractions is obtained at a temperature between about 400° F. and about 700° F., the particularly preferred upper temperature being about 650° F. within the other aforesaid preferred conditions of pressure, space velocity, etc.

Hydrogen should be introduced into the reaction zone at a rate of from about 300 to about 20,000 standard cubic feet per barrel (s.c.f.b.) or the hydrogen to hydrocarbon mole ratio may fall within the range of from 1 to about 25 moles of hydrogen per mole of hydrocarbon with the total reaction pressure maintained between about 0 and about 2000 pounds per square inch gage (p.s.i.g.), preferably between about 200 and about 1000 p.s.i.g. It is desirable that the hydrogen partial pressure be carefully controlled within the preferred range of from about 15 to about 1500 pounds per square inch absolute (p.s.i.a.) preferably from about 100 to about 900 p.s.i.a. to effect the desired conversion while maintaining the activity of the catalyst at a high level.

The catalysts of this invention are also useful for desulfurizing sulfur-containing hydrocarbon oils, e.g. naphthas, kerosene, gasoline, gas oils, total crudes, etc. The desulfurization is effected at a temperature between about 600° F. and about 850° F. The desulfurization reactions can be effected at either exceptionally high pressures in the order of up to about 2000 p.s.i.g. or at pressures as low as 100 p.s.i.g. More usually, desulfurization by means of the catalysts of this invention is accomplished at a pressure of about 500 to about 1000 p.s.i.g. The desulfurization is effected in the presence of hydrogen and the conditions of operation are such that hydrogen is consumed in the operation. Generally, the hydrogen is supplied to the process at the rate of about 1000 to about 20,000 s.c.f.b., preferably at a rate of between about 3000 and about 10,000 s.c.f.b. Generally the weight space velocity ranges between about 0.1 and about 15 pounds per hour of hydrocarbon feed charged to the desulfurization zone per pound of catalyst present therein, and more usually from about 1 to about 8.

The catalysts of this invention may be employed effectively as pellets, pills, spheres, rings, extrusions, lumps, granules, extrusions or in a powdered state and these forms may be used in both fluidized systems and those employing moving beds of contact material in either concurrent or countercurrent flow relative to the reactants. The catalysts may also be employed in a slurry type system without departing from the scope of this invention.

The following examples are offered as a better understanding of the present invention, and are not to be construed as unnecessarily limiting thereto.

CATALYST I

To 46.36 grams of silica-magnesia containing 30 weight percent magnesia there was added a solution of 3.70 grams of ammonium molybdate tetrahydrate,

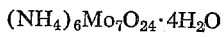

in 40 cc. of distilled water. The resulting paste was mixed thoroughly, followed by drying to a solid in an oven at 250° F. for 24 hours. The dried material was then calcined for 2 hours at 1000° F. The calcined product (46.42 grams) was then impregnated with a solution of 1.94 grams of nickel acetate tetrahydrate in 45 cc. of distilled water. The paste was mixed thoroughly, excess water was driven off and dried to a solid in an oven for about 24 hours at 250° F. The dried solid was ground to a powder and calcined for 2 hours at 1000° F. The calculated composition, based upon ingredients added, was 6.04 weight percent $MoO_3$, 1.24 weight percent NiO, 28 weight percent MgO and 65 weight percent $SiO_2$, the atom ratio of Mo/Ni being 2.5.

CATALYST II

To 45.45 grams of silica-magnesia containing 30 weight percent magnesia there was added a solution of 4.62 grams of ammonium molybdate tetrahydrate,

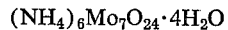

in 40 cc. of distilled water. The resulting paste was mixed thoroughly, followed by drying to a solid in an oven at 250° F. for 24 hours. The dried material was then calcined for 2 hours at 1000° F., and the calcined product (45.72 grams) was impregnated with a solution of 2.39 grams of nickel acetate tetrahydrate in 45 cc. of distilled water. The paste was mixed thoroughly, excess water was driven off and dried to a solid in an oven for about 24.5 hours at 250° F. The dried solid was ground to a powder and calcined for 2 hours at 1000° F. The calculated composition, based upon ingredients added, was 7.55 weight percent $MoO_3$, 1.55 weight percent NiO, 27 weight percent MgO and 63 weight percent $SiO_2$, the atom ratio of molybdenum to nickel being 2.5.

CATALYST III

To 43.93 grams of silica-magnesia containing 30 weight percent magnesia there was added a solution of 6.17 grams of ammonium molybdate tetrahydrate,

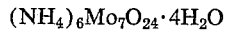

in 40 cc. of distilled water. The resulting paste was mixed thoroughly, followed by drying to a solid in an oven at 250° F. for 23.5 hours. The dried material was then calcined for 2 hours at 1000° F., and the calcined product (45.75 grams) was impregnated with a solution of 3.21 grams of nickel acetate tetrahydrate in 45 cc. of distilled water. The paste was mixed thoroughly, excess water was driven off and the paste was then dried to a solid in an oven for about 26.8 hours at 250° F. The dried solid was ground to a powder and then calcined for 2 hours at 1000° F. The calculated composition, based upon ingredients added, was 10.07 weight percent $MoO_3$, 2.07 weight percent NiO, 26 weight percent MgO and 61 weight percent $SiO_2$, the atom ratio of molybdenum to nickel being 2.5.

CATALYST IV

To 40.90 grams of silica-magnesia containing 30 weight percent magnesia there was added a solution of 9.26 grams of ammonium molybdate tetrahydrate.

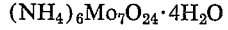

in 40 cc. of distilled water. The resulting paste was mixed thoroughly, followed by drying to a solid in an oven at 250° F. for 22 hours. The dried material was then calcined for 2 hours at 1000° F. The calcined product (45.80 grams) was impregnated with a solution of 4.87 grams of nickel acetate tetrahydrate in 45 cc. of distilled water. The paste was mixed thoroughly, excess water was driven off and the paste was then dried to a solid in an oven for about 27 hours at 250° F. The dried solid was ground to a powder and calcined for 2 hours at 1000° F. The calculated composition, based upon ingredients, was 15.10 weight percent $MoO_3$, 3.10 weight percent NiO, 24 weight percent MgO and 57 weight percent $SiO_2$, the atom ratio of molybdenum to nickel being 2.5.

CATALYST V

To 15.88 grams of silica-magnesia containing 30 weight percent magnesia there was added a solution of 9.25 grams of ammonium molybdate tetrahydrate,

in 35 cc. of distilled water. The resulting paste was mixed thoroughly, followed by drying to a solid in an oven at 250° F. for 21 hours. The dried material was then calcined for 2 hours at 1000° F. The calcined product (22.52 grams) was then impregnated with a solution of 5.02 grams of nickel acetate tetrahydrate in 35 cc. of distilled water. The paste was mixed thoroughly, excess water was driven off and the mixture was then dried to a solid in an oven for about 21 hours at 250° F. The dried solid was ground to a powder and calcined for 2 hours at 1000° F. The calculated composition based upon ingredients added, was 30.2 weight percent $MoO_3$, 6.27 weight percent NiO, 19 weight percent MgO and 44 weight percent $SiO_2$, the atom ratio of molybdenum to nickel being 2.5.

CATALYST VI

To 29.6 grams of silica-magnesia containing 30 percent by weight magnesia which had been calcined for 1 hour at 1000° F. there was added 0.65 gram of a 48 percent aqueous solution of hydrofluoric acid in 30 cc. of distilled water. The resulting paste was mixed thoroughly, followed by drying in an oven at 250° F. for about 24 hours. The dried solid was then calcined for 2 hours at 1000° F. and the calcined product (22.72 grams) was impregnated with a solution of 2.31 grams of ammonium molybdate tetrahydrate in 25 cc. of distilled water. The paste was mixed thoroughly and then dried in an oven at 250° F. for 19.5 hours, followed by calcination at 1000° F. for 2 hours. The dried solid (24.17 grams) was then impregnated with a solution of 1.26 grams of nickel acetate tetrahydrate in 25 ml. of distilled water. The paste was mixed thoroughly and dried to a solid in an oven for about 18 hours at 250° F., followed by calcination for 2 hours at 1000° F. The calculated composition, based upon ingredients added, was 1.0 weight percent F, 7.55 weight percent $MoO_3$, 1.55 weight percent NiO, 27 weight percent MgO and 63 weight percent $SiO_2$, the atom ratio of molybdenum to nickel being 2.5.

CATALYST VII

To 270.7 grams of silica-magnesia containing 30 percent by weight magnesia there was added 18.28 grams of a 48 percent aqueous solution of hydrofluoric acid in 225 cc. of distilled water. The resulting paste was mixed thoroughly, followed by drying in an oven at 250° F. for about 23.5 hours. The dried solid was calcined for 2 hours at 1000° F. and the calcined product (265.45 grams) was impregnated with a solution of 27.03 grams of ammonium molybdate tetrahydrate in 240 cc. of distilled water. The paste was mixed thoroughly and then dried in an oven at 250° F. for 16 hours, followed by calcination at 1000° F. for 2 hours. The dried solid (245.2 grams) was then impregnated with a solution of 12.66 grams of nickel acetate tetrahydrate in 220 ml. of distilled water. The paste was mixed thoroughly and dried to a solid in an oven at 250° F. for 22 hours, followed by calcination for 2 hours at 1000° F. The calculated composition, based upon ingredients added, was 3 weight percent F, 7.55 weight percent $MoO_3$, 1.55 weight percent NiO, 26 weight percent MgO and 61 weight percent $SiO_2$, the atom ratio of molybdenum to nickel being 2.5.

CATALYST VIII

To 20.00 grams of silica-magnesia containing 30 weight percent magnesia there was added 2.31 grams of ammonium molybdate tetrahydrate in 25 ml. of distilled water. The paste was mixed thoroughly and dried in an oven at 250° F. for about 22.5 hours. The dried solid was ground to a powder and was then calcined for 2 hours at 1000° F. The calcined product (20.89 grams) was then impregnated with a solution of 1.23 grams of nickel acetate tetrahydrate in 25 ml. of distilled water. The paste was mixed thoroughly and was then dried in an oven at 250° F. for about 21 hours. The dried product was ground to a powder and was then calcined for 2 hours at 1000° F. The calcined product (21.03 grams) was then impregnated with a solution of 4.57 grams of boric acid ($H_3BO_3$) in 20 ml. of distilled water. The excess water was driven off, the paste was mixed thoroughly and was then dried in an oven at 250° F. for 19.5 hours. The dried solid was ground to a powder and then calcined for 2 hours at 1000° F. The calculated composition, based upon ingredients added, was 7.55 weight percent $MoO_3$, 1.55 weight percent NiO, 10.91 weight percent $B_2O_3$, 24 weight percent MgO and 56 weight percent $SiO_2$, the atom ratio of molybdenum to nickel being 2.5.

CATALYST IX

To 600 grams of silica-magnesia containing 30 weight percent magnesia there was added a solution of 145.3 grams of boric acid ($H_3BO_3$) in 455 ml. of distilled water. The paste was mixed thoroughly and then dried in an oven at 250° F. for about 23 hours, followed by calcination for 2 hours at 1000° F. A portion of the calcined product (22.72 grams) was then impregnated with a solution of 2.31 grams of ammonium molybdate tetrahydrate in 25 ml. of distilled water. The paste was mixed thoroughly and dried in an oven at 250° F. for 23.5 hours and the dried solid was ground to a powder and calcined for 2 hours at 1000° F. The calcined product (23.48 grams) was then impregnated with a solution of 1.22 grams of nickel acetate tetrahydrate in 25 ml. of distilled water. The paste was then mixed thoroughly, dried in an oven at 250° F. for 23 hours, ground to a powder and then calcined for 2 hours at 1000° F. The calculated composition, based upon ingredients, was 7.55 weight percent $MoO_3$, 1.55 weight percent NiO, 10.91 weight percent $B_2O_3$, 24 weight percent MgO and 56 weight percent $SiO_2$, the atom ratio of molybdenum to nickel being 2.5.

CATALYST X

A solution of ammonium molybdate prepared by dissolving 1.47 grams of $(NH_4)_6Mo_7O_{24} \cdot 4H_2O$, in 10 ml. distilled water, was added to 18.55 grams of powdered silica prepared by calcining desiccant grade silica gel (99.9 weight percent silica) for 2 hours at 1000° F. After thorough mixing, the mixing was dried at 250° F. for 18 hours. The dried powder was reimpregnated with additional ammonium molybdate solution, i.e. 0.824 gram of $(NH_4)_6Mo_7O_{24} \cdot 4H_2O$ in water, to wet the solid thoroughly, and redried 18 hours at 250° F. The dried solid was calcined 2 hours at 1000° F. The calcined product (20.16 grams) was then impregnated with an aqueous solution containing 1.277 grams of nickel acetate tetrahydrate to give a homogeneous paste. The paste was dried to a solid at 250° F. After 93 hours at 250° F., the solid was then calcined for 2 hours at 1000° F. The calculated composition, based upon ingredients added, was 9.01 weight percent $MoO_3$, 1.87 weight percent NiO and the remainder $SiO_2$, the Mo/Ni ratio being 2.5.

The relative effectiveness of the above-described catalysts was determined by using the same in a laboratory hydrogenation test unit using benzene as the typical test feed, the test operation being carried out at conversions well below equilibrium conditions in order to obtain an accurate comparison of the catalyst activities. In these tests, the reactor (8″ long with ½″ inner diameter) was charged with 1 or 5 grams of catalyst powder using glass wool as packing, and alundum as the preheat zone. The reactor was connected into the unit and a hydrogen-hydrogen sulfide gas mixture containing 2 mole percent hydrogen sulfide was passed through the reactor at a pressure of about 325 p.s.i.g. The temperature was then raised to about 750° F., and was held under these conditions for about 1 hour while passing the $H_2/H_2S$ gas stream therethrough. At the start of each run, the $H_2/H_2S$ stream was then allowed to pick up benzene, the mole percent of benzene in the $H_2/H_2S$ stream being constant at 0.55. In testing each catalyst the flow rate of the $H_2/H_2S$/benzene mixture through the reactor was changed in order to obtain at least two different conversions for each catalyst for calculation of the hydrogenation rate constant at a definite temperature, i.e. at 750° F. expressed as $k_{750°\ F.}$, the following discussion dealing with the derivation of this constant. The standard mathematical equation for expressing a first order reaction is $$-dc/dt = k'c \quad (1)$$

wherein $c$ is the concentration of reacting material, $k'$ is a proportionality factor also referred to as the specific reaction rate constant or the velocity constant, $t$ is the time and $-dc/dt$ is the rate at which the concentration of reacting material decreases. Rearrangement of Equation 1 and integration between the limits of $c_0$ at $t_0$ (zero time) and $c$ at time $t$, leads to the following first order kinetic equation $$k' = \frac{1}{t} \ln \frac{c_0}{c} \quad (2)$$

In applying Equation 2 to the hydrogenation of benzene as described and tabulated in the following Tables I–III some simplifications are made. For example, at zero time, the initial concentration of benzene reactant is 100 percent. Also at a steady state condition, i.e., at a constant amount of hydrogenation under a fixed flow of feed (hydrogen, hydrogen sulfide and benzene) the percent of conversion (C) of benzene to cyclohexane (and methyl cyclopentane) obtained from the gas chromotography analytical record allows the following modification in Equation 2.

$$k' = \frac{1}{t} \ln \frac{100}{100-C} \quad (3)$$

is directly related to $1/t$, Equation 3 may be expressed as the following pseudo first order equation:

$$k = SV \ln \frac{100}{100-C} \quad (4)$$

which, when rearranged into the usual form for a straight line relationship reads as follows:

$$\ln \frac{100}{100-C} = k \frac{1}{SV} \quad (5)$$

When the logarithm of $100/100-C$ is plotted as the ordinate and the reciprocal space velocity as the abscissa, and the slope multiplied by 2.303, the value of $k$ or the hydrogenation rate constant is obtained. It is noted that the use of the outlet gas flow rate rather than the actual flow rate of benzene is a reasonable and necessary manipulative convenience. Since the hydrogen-hydrogen sulfide gas picks up only a small amount of benzene from the saturator at room temperature, the ratio of benzene to the gas is constant at all times. It is further noted that the low conversion has little if any effect and the amount of benzene passing over the catalyst becomes a direct function of the outlet flow rate. It is seen therefore that the value of "$k$" represents the effectiveness of the particular catalyst to hydrogenate benzene to saturated liquid product at the standard conditions employed herein (325 p.s.i.g. and 750° F.) in the above described system, and it relates to space velocity and conversion. The value of "$k$" was also converted to the space velocity required to obtain a 90 percent conversion of benzene under these test conditions. It should be borne in mind that in this test operation the contact time in each instance was very low due to the fact that only 1 or 5 grams of catalyst was employed. This was done in order to operate well below equilibrium conditions and thus obtain accurate comparisons. In each instance, however, at higher contact times, i.e. in the presence of more catalyst, the conversion of benzene is proportionally higher, but the activity of the catalyst remains the same. The test conditions and results of these runs are set forth in the following Table I.

*Table I.—Hydrogenation of benzene*

| Run No. | 1 | 2 | 3 | 4 | 5 | 6 |
|---|---|---|---|---|---|---|
| Catalyst No. | I | II | III | IV | V | X |
| Composition: | | | | | | |
| Percent $MoO_3$ | 6.0 | 7.6 | 10.1 | 15.1 | 30.2 | 9.0 |
| Percent NiO | 1.2 | 1.6 | 2.1 | 3.1 | 6.3 | 1.9 |
| Support | (1) | (1) | (1) | (1) | (1) | Silica |
| Pretreatment of Catalyst: | | | | | | |
| Catalyst charge, grams | 1 | 1 | 1 | 5 | 1 | 5 |
| Catalyst Temperature, °F | 750 | 750 | 750 | 750 | 750 | 750 |
| Reaction Pressure, p.s.i.g. | 325 | 325 | 325 | 318 | 325 | 330 |
| Gas composition | (2) | (2) | (2) | (2) | (2) | (2) |
| Treatment time, hours | 1 | 1 | 1 | 1 | 1 | 1.5 |
| Test conditions: | | | | | | |
| Catalyst Temperature, °F | 750 | 750 | 750 | 750 | 750 | 750 |
| Reaction Pressure, p.s.i.g. | 325 | 325 | 325 | 318 | 325 | 325 |
| Flow rate, standard cc./min | 78  113 | 91  140  208 | 135  173  216 | 163  220  88 | 70  113 | 298  131 |
| Feed | Benzene | Benzene | Benzene | Benzene | Benzene | Benzene |
| Carrier Gas | (2) | (2) | (2) | (2) | (2) | (2) |
| Results: | | | | | | |
| Conversion, Percent | 29.0  23.99 | 34.9  17.7  14.3 | 33.1  25.8  21.4 | 64.5  48.7  80.8 | 31.2  19.3 | 11  13 |
| Hydrogenation Activity Constant, $k_{750°F.}$ | 31.2 | 34.9 | 52.2 | 30.0 | 25.0 | 4.6 |
| Space Velocity Required to Obtain 90% Conversion of Benzene | 0.0074 | 0.0083 | 0.0123 | 0.0071 | 0.0059 | 0.0011 |

[1] Silica-Magnesia Containing 30 Weight Percent Magnesia.
[2] Made Percent $H_2S$ in $H_2$.

The total outlet gas flow rate as measured on a calibrated flowmeter corrected to 0° C. and one atmosphere, when divided by the weight of catalyst gives a value in units of cubic centimeters (cc.) of gas at standard conditions of temperature and pressure (STP) per gram of catalyst per minute which represents the space velocity (SV). Since the space velocity is in units of reciprocal time and From the results of the above Table I, it may be seen that the catalysts of this invention possess outstanding hydrogenation activity as compared with catalysts employing the same catalytic agents supported on silica alone. The hydrogenation activity of Catalyst III, which contained about 10.1 weight percent $MoO_3$ and 2.1 weight percent NiO, was particularly outstanding.

The improved hydrogenation activity of the catalysts of this invention also is demonstrated by comparing their activity with that of a typical prior art hydrogenation catalyst such as cobalt molybdate on alumina containing 13.8 weight percent $MoO_3$ and 3.1 weight percent CoO on alumina which, for the purpose of this invention, is designated as Catalyst XI. The hydrogenation of benzene in the presence of 5 grams of Catalyst XI was carried out under substantially the same conditions employed in effecting runs 1 to 6 of Table I above. In this particular run, the catalyst was pretreated at a temperature of 750° F. and a pressure of 318 pounds per square inch for 1 hour with hydrogen gas containing 2 mole percent $H_2S$. Benzene vapor carried in a hydrogen stream containing 2 mole percent $H_2S$ was then passed into the reactor and contacted with the catalyst so treated, at a temperature of 750° F., and a pressure of 318 pounds per square inch gage, at flow rates of 77 and 42 standard cc. per minute, yielding conversions of 22 and 42 respectively. These conversions correspond to a hydrogenation activity constant, expressed as $k_{750°\ F.}$, of 4.4. This result demonstrates the fact that the catalysts of this invention possess significantly higher hydrogenation activity than a typical prior art-type hydrogenation catalyst.

The above-described Catalysts VI–IX were also tested for their hydrogenation activity using substantially the same test procedure and conditions described above for effecting the runs of Table I above. The specific operating conditions employed and results obtained are tabulated in the following Table II in which run number 2 of Table I is repeated for purposes of comparison.

From the results of Table II above, it may be seen that the incorporation of 1 weight percent of fluorine, as in Catalyst VI employed in run number 7, increased the hydrogenation activity of Catalyst II about 20 percent. Incorporation of about 3 percent by weight as in Catalyst VII employed in run number 8 increased activity of Catalyst II by about 15 percent. Comparison of the results of run number 9 in which Catalyst VIII was employed with the results of run number 2, shows that the activity of Catalyst II was decreased markedly by incorporating boria into the catalyst after the silica-magnesia support had been impregnated with the compounds of molybdenum and nickel. On the other hand, comparison of the results of run number 10, in which Catalyst IX was employed, with the results of run number 2 shows that the activity of Catalyst II was increased about 60 percent by incorporating boria into the silica-magnesia support prior to impregnation with the compounds of molybdenum and nickel.

As stated above, the catalysts of this invention are particularly suited as catalysts for the hydrogenation of low-quality kerosene. This is shown by the results shown in the following Table III. In these runs the above-described Catalysts III and VII were employed, and a kerosene fraction boiling between about 350° F. and about 550° F., having a smoke point of 20 mm. and a gasoline content of 11 weight percent was employed as feed. The operation was conducted, employing a 0.5 inch I.D. down flow reactor charged with 2 or 10 grams of catalyst. In each instance the catalyst was pretreated by passing a hydrogen stream containing 2 mole percent $H_2S$ through the reactor at various temperatures at a pressure of 800 pounds per square inch for 1 hour. The catalyst temperature was then adjusted to the desired operating temperature and pressure prior to introducing the kerosene feed and hydrogen gas containing 2 mole percent hydrogen sulfide to the reactor. The specific operating conditions employed and results of these tests are presented in the following Table III.

*Table II.—Hydrogenation of benzene*

| Run No. | 2 | 7 | 8 | 9 | 10 |
|---|---|---|---|---|---|
| Catalyst No. | II | VI | VII | VIII | IX |
| Composition: | | | | | |
| Percent $MoO_3$ | 7.6 | 7.6 | 7.6 | 7.6 | 7.6 |
| Percent NiO | 1.6 | 1.6 | 1.6 | 1.6 | 1.6 |
| Promotor | | 1% F | 3% F | [1] 11% $B_2O_3$ | [2] 11% $B_2O_3$ |
| Pretreatment of Catalyst: | | | | | |
| Catalyst charge, grams | 1 | 1 | 1 | 1 | 1 |
| Catalyst Temperature, °F | 750 | 750 | 750 | 750 | 750 |
| Reaction Pressure, p.s.i.g | 325 | 321 | 325 | 323 | 325 |
| Gas Composition | [3] | [3] | [3] | [3] | [3] |
| Treatment time, hours | 1 | 1 | 1 | 1 | 1 |
| Test Conditions: | | | | | |
| Catalyst Temperature, °F | 750 | 750 | 750 | 750 | 66 |
| Reaction Pressure, p.s.i.g | 325 | 325 | 325 | 324 | 325 |
| Flow rate, standard cc./min | 91 140 208 | 65 86 143 | 92 119 203 | 63 101 149 | 147 205 |
| Feed | Benzene | Benzene | Benzene | Benzene | Benzene |
| Carrier Gas | [3] | [3] | [3] | [3] | [3] |
| Results: | | | | | |
| Conversion, percent | 34.9 17.7 14.3 | 47.3 40.4 27.1 | 34.2 27.7 21.3 | 33.5 18.6 17.0 | 32.2 22.4 |
| Hydrogenation Activity Constant, $k_{750°\ F.}$ | 34.9 | 42.1 | 40.7 | 18.7 | 55.6 |
| Space Velocity Required to Obtain 90% Conversion of Benzene | 0.0083 | 0.0099 | 0.0096 | 0.0044 | 0.0131 |

[1] The boron oxide was added to the support after the support was impregnated with the molybdenum and nickel compounds.
[2] The boron oxide was added to the support prior to impregnation of the support with the molybdenum and nickel compounds.
[3] 2 mole percent $H_2S$ in $H_2$.

*Table III.—Hydrogenation of kerosene*

| Run No. | 11 | 12 | 13 |
|---|---|---|---|
| Catalyst No. | VII | VII | III |
| Composition: | | | |
| Percent $MoO_3$ | 7.6 | 7.6 | 10.1 |
| Percent NiO | 1.6 | 1.6 | 2.0 |
| Percent F | 3.0 | 3.0 | |
| Support | [1] | [1] | [1] |
| Weight, grams | 10.0 | 10.0 | 10.0 |
| Activation, 2 Mole Percent $H_2S$ in $H_2$: | | | |
| Temperature, °F | 700 | 650 | 750 |
| Pressure, p.s.i.g | 800 | 800 | 800 |
| Time, hours | 1.0 | 1.0 | 1.0 |
| Gas rate, cu. ft./hr. 70° F | 0.475 | 0.470 | 0.580 |
| Run Conditions: | | | |
| Temperature, °F | 700 | 650 | 650 |
| Pressure, p.s.i.g | 800 | 800 | 800 |
| Time, hours | 2.0 | 2.0 | 2.0 |
| Space Velocity, w./hr./w | 1.55 | 1.57 | 1.60 |
| $H_2$Gas/Oil, M/M | 9.51 | 8.72 | 8.86 |
| Yields, Weight Percent Output: | | | |
| Gas ($C_1$–$C_4$) | 0.5 | 0.5 | 0.5 |
| Gasoline, 400° F. E.P | 26.6 | 19.1 | 27.2 |
| Kerosene, 400° F.+ | 72.5 | 80.1 | 72.0 |
| Carbon | 0.4 | 0.3 | 0.3 |
| Inspections on Total Liquid Product: | | | |
| API Gravity | 45.8 | 44.4 | 45.4 |
| Aniline Point, °F | 158.0 | 158.0 | 159.5 |
| Smoke Point, mm | 23.2 | 27.0 | 30.0 |

[1] 30 weight percent magnesia-silica.

One important property of a catalyst is to be used for the hydrogenation of kerosene, is its ability to upgrade the kerosene without excessive loss of desired product boiling within the kerosene range, due to hydrocracking of the feed to lower boiling normally liquid hydrocarbon fractions or to normally gaseous hydrocarbons, i.e. $C_1$-$C_4$ compounds. The kerosene feed employed in the runs of Table III above contained 11 weight percent of gasoline, i.e. normally liquid product having an end boiling point of about 400° F. Inspection of the data of Table III shows that the net production of gasoline and yield of $C_1$-$C_4$ compounds were relatively low. Comparison of the results obtained in run numbers 11 and 12 in which the same Catalyst VII was employed, shows that lowering the hydrogenation temperature from 700° F. to 650° F. led to a greater improvement in smoke point. Inspection of the results obtained in run number 13 in which the non-fluorided silica-magnesia supported Catalyst III was employed, shows that this type of catalyst increased the smoke point from 20 to 30 mm. without excessive hydrocracking of the feed.

Although the silica-magnesia support employed in accordance with the teachings of this invention is commonly regarded as a support suitable for catalysts to be used for hydrocracking, i.e., splitting of carbon-to-carbon bonds, it is unexpectedly found that when used in combination with oxides and/or sulfides of molybdenum and nickel, the resulting catalyst is not a suitable hydrocracking catalyst since it possesses only low hydrocracking activity and a high tendency to produce carbon under hydrocracking conditions.

On the other hand, due to their low carbon producing tendency under the hydrogenation conditions described herein, the catalysts of this invention may be used for long periods of time without requiring regeneration or reactivation during the hydrogenation process. However, after the catalysts have become deactivated due to prolonged use, they may be regenerated by treatment with hydrogen at an elevated temperature to remove sulfur as hydrogen sulfide followed by treatment with oxygen or an oxygen-containing gas to burn off carbon, and then subjected to treatment with a hydrogen-hydrogen sulfide stream under the aforesaid conditions.

Various modifications and alterations of the process and catalysts of this invention may become apparent to those skilled in the art without departing from the scope of this invention.

Having described my invention, I claim:

1. A process for the treatment of hydrocarbons wherein non-destructive hydrogenation is the principal hydrocarbon conversion reaction which consists essentially of hydrogenating an unsaturated hydrocarbon in the presence of added hydrogen and a catalyst consisting of a compound of nickel selected from the group consisting of an oxide and sulfide thereof and between about 5 and about 30 weight percent of a compound of molybdenum, expressed as molybdenum trioxide, selected from the group consisting of an oxide and sulfide thereof, supported on a carrier consisting of silica and magnesia in an amount between about 10 and about 50 weight percent based on the weight of the carrier, said compound of nickel being present in an amount to provide an atom ratio of molybdenum to nickel of between about 1 and about 4.5, under hydrogenation conditions including a temperature between about 200° F. and about 850° F. such that hydrogen is consumed.

2. The process of claim 1 in which said compound of molybdenum is present in an amount between about 6 and about 20 weight percent, said compound of nickel is present in an amount to provide an atom ratio of molybdenum to nickel of between about 2 and about 3 and said temperature is between about 400° F. and about 800° F.

3. A hydrogenation process which consists essentially of hydrogenating a hydrocarbon fraction boiling within the kerosene boiling range in the presence of added hydrogen and a catalyst consisting of a compound of nickel selected from the group consisting of an oxide and sulfide thereof, between about 5 and about 30 weight percent of a compound of molybdenum, calculated as molybdenum trioxide, selected from the group consisting of an oxide and sulfide thereof supported on a carrier consisting of silica and between about 10 and about 50 weight percent magnesia based on the weight of the carrier, the atom ratio of molybdenum to nickel being between about 1 and about 4.5 under hydrogenation conditions including a temperature between about 400° F. and about 700° F.

4. A process for the treatment of hydrocarbons wherein non-destructive hydrogenation is the principal hydrocarbon conversion reaction which consists essentially of hydrogenating a feed containing unsaturated hydrocarbons in the presence of added hydrogen and a catalyst consisting of (a) a compound of nickel selected from the group consisting of an oxide and sulfied thereof, (b) between about 5 and about 30 weight percent of a compound of molybdenum, expressed as molybdenum trioxide, selected from the group consisting of an oxide and sulfide thereof, the compound of nickel being present in an amount to provide an atom ratio of molybdenum to nickel of between about 1 and about 4.5, (c) fluorine in an amount between about 0.5 and about 5 weight percent, and (d) a carrier consisting of silica and between about 10 and about 50 weight percent magnesia based on the weight of the carrier, under hydrogenation conditions including a temperature between about 400° F. and about 800° F.

5. A process for the treatment of hydrocarbons wherein non-destructive hydrogenation is the principal hydrocarbon conversion reaction which consists essentially of hydrogenating a feed containing unsaturated hydrocarbons in the presence of added hydrogen at a temperature between about 400° F. and about 800° F. and a catalyst consisting of (a) a compound of nickel selected from the group consisting of an oxide and sulfide thereof, (b) between about 5 and about 30 weight percent of a compound of molybdenum, expressed as molybdenum trioxide, selected from the group consisting of an oxide and sulfide thereof, (c) between about 5 and about 20 weight percent of boron oxide, and (d) a carrier consisting of silica and between about 10 and about 50 weight percent magnesia based on the weight of the support, the nickel compound being present in an amount to provide an atom ratio of molybdenum to nickel of between about 1 and about 4.5, said boron oxide being incorporated into the catalyst prior to the incorporation of said compounds of nickel and molybdenum.

6. A process for the treatment of hydrocarbons wherein non-destructive hydrogenation is the principal hydrocarbon conversion reaction which consists essentially of passing a feed containing unsaturated hydrocarbons to a hydrogenation zone maintained at a temperature between about 200° F. and about 800° F., in said zone hydrogenating said feed with added hydrogen in the presence of a catalyst consisting of a compound of nickel selected from the group consisting of an oxide and sulfide thereof, between about 6 and about 20 weight percent of a compound of molybdenum, expressed as molybdenum trioxide, selected from the group consisting of an oxide and sulfide thereof and a silica-magnesia support containing between about 20 and about 40 weight percent magnesia based on the weight of the support, said compound of nickel being present in an amount to provide an atom ratio of molybdenum to nickel of between about 2 and about 3, and withdrawing from said zone product having a lower degree of unsaturation than said feed.

7. A catalyst composition prepared by the method which comprises impregnating a support consisting of silica and between about 10 and about 50 weight percent magnesia, with boric acid in an amount to provide a catalyst containing between about 5 and about 20 weight perecnt boron oxide, followed by impregnation of said support with a compound of molybdenum in an amount to provide a catalyst composite containing between about 6 and about 20 weight percent molybdenum oxide, calculated as molybdenum trioxide, and a compound of nickel capable of yielding nickel oxide in an amount to provide a molybdenum to nickel ratio of between about 2 and about 3, said catalyst composition consisting of silica, magnesia, boron oxide, molybdenum oxide and nickel oxide within the aforesaid amounts.

8. A process in which non-destructive hydrogenation of unsaturated hydrocarbons is the principal hydrocarbon conversion reaction which consists essentially of activating a catalyst consisting of nickel oxide, between about 5 and about 30 weight percent of molybdenum oxide, expressed as molybdenum trioxide, supported on a carrier consisting of silica and between about 10 and about 50 weight percent magnesia based on the weight of the support, the atom ratio of molybdenum to nickel being between about 1 and about 4.5, with a gaseous stream containing between about 0.1 and about 5 mol percent of hydrogen sulfide at a temperature between about 400° F. and about 1000° F., hydrogenating a feed containing an unsaturated hydrocarbon at a temperature between about 400° F. and about 800° F. in the presence of added hydrogen and said catalyst after the catalyst has been subjected to said activation treatment.

9. The process of claim 8 in which said feed contains an aromatically unsaturated hydrocarbon and the hydrogenation is carried out at a pressure between about 200 and about 800 pounds per square inch gage.

10. A process for the treatment of hydrocarbons wherein non-destructive hydrogenation is the principal hydrocarbon conversion reaction which comprises activating a catalyst consisting of about 2 weight percent nickel oxide and about 10 weight percent molybdenum oxide, expressed as molybdenum trioxide, supported on a carrier consisting of silica and between about 10 and about 50 weight percent magnesia based on the total weight of the support, with a gaseous hydrogen stream containing between about 0.1 and about 5 mol percent of hydrogen sulfide at a temperature between about 400° F. and about 1000° F., and hydrogenating a hydrocarbon fraction boiling within the kerosene boiling range in the presence of a hydrogen-rich gas and said catalyst after the catalyst has been subjected to said activation treatment, at a temperature between about 400° F. and about 700° F. such that said hydrocarbon fraction is hydrogenated.

11. A method for preparing a catalytic composition useful for the non-destructive hydrogenation of hydrocarbons which consists essentially of impregnating a support consisting of silica and between about 10 and about 50 weight percent magnesia, with an aqueous solution of boric acid containing boric acid in an amount to provide a final catalyst composite containing between about 5 and about 20 weight percent boron oxide, followed by impregnation of said support having said boric acid thereon with a solution of ammonium molybdate in an amount to provide a final catalyst containing between about 6 and about 20 weight percent molybdenum oxide, expressed as molybdenum trioxide, and a solution of nickel acetate in an amount to provide in the finished catalyst composite an atom ratio of molybdenum to nickel of between about 2 and about 3, the final catalyst composite consisting of molybdenum oxide, nickel oxide and boron oxide in the aforesaid amounts supported on said silica-magnesia support.

References Cited by the Examiner
UNITED STATES PATENTS

| | | | |
|---|---|---|---|
| 2,878,180 | 3/1959 | Watkins | 208—216 |
| 2,890,165 | 6/1959 | Bendars et al. | 208—216 |
| 2,894,903 | 7/1959 | McGrath et al. | 208—216 |
| 2,905,625 | 9/1959 | Berger | 208—216 |
| 2,905,636 | 9/1959 | Watkins et al. | 208—216 |

DELBERT E. GANTZ, *Primary Examiner.*

ALPHONSO D. SULLIVAN, *Examiner.*

S. P. JONES, *Assistant Examiner.*

UNITED STATES PATENT OFFICE
CERTIFICATE OF CORRECTION

Patent No. 3,269,938                                       August 30, 1966

Philip A. Lefrancois

It is hereby certified that error appears in the above numbered patent requiring correction and that the said Letters Patent should read as corrected below.

Column 8, line 45, for "mixing", second occurrence, read -- mixture --; columns 9 and 10, Table I, footnote 2, line 2, for "Made Percent $H_2S$ in $H_2$" read -- 2 Mole Percent $H_2S$ in $H_2$ --; same Table I, second column, line 15, for "23.99" read -- 23.9 --.

Signed and sealed this 22nd day of August 1967.

(SEAL)
Attest:

ERNEST W. SWIDER
Attesting Officer

EDWARD J. BRENNER
Commissioner of Patents